US010771687B2

(12) United States Patent
Uchihara et al.

(10) Patent No.: US 10,771,687 B2
(45) Date of Patent: Sep. 8, 2020

(54) IMAGE CAPTURING APPARATUS, IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Masato Uchihara, Tokyo (JP); Takayuki Hara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/430,862

(22) Filed: Jun. 4, 2019

(65) Prior Publication Data
US 2019/0379823 A1 Dec. 12, 2019

(30) Foreign Application Priority Data

Jun. 7, 2018 (JP) ................................ 2018-109472
Jun. 8, 2018 (JP) ................................ 2018-110632

(51) Int. Cl.
*H04N 5/232* (2006.01)

(52) U.S. Cl.
CPC ..... *H04N 5/23222* (2013.01); *H04N 5/23227* (2018.08); *H04N 5/232939* (2018.08)

(58) Field of Classification Search
CPC .................................................. H04N 5/23293
USPC .......................... 348/231.1, 333.01, 333.02
See application file for complete search history.

(56) References Cited

U.S. PATENT DOCUMENTS

| | | | | |
|---|---|---|---|---|
| 6,415,102 B1* | 7/2002 | Fujii | ................. | H04N 1/00915 |
| | | | | 348/207.99 |
| 6,919,926 B1* | 7/2005 | Sato | .................... | H04N 1/2112 |
| | | | | 348/222.1 |
| 7,012,638 B1* | 3/2006 | Yokonuma | ......... | H04N 5/23245 |
| | | | | 348/207.99 |
| 7,236,189 B2* | 6/2007 | Hirata | ................. | H04N 1/2112 |
| | | | | 348/222.1 |
| 2002/0033960 A1* | 3/2002 | Kazami | ............... | H04N 5/9201 |
| | | | | 358/1.14 |
| 2005/0151858 A1* | 7/2005 | Nozaki | ............... | H04N 1/2112 |
| | | | | 348/231.9 |
| 2014/0204243 A1* | 7/2014 | Hayashi | ................. | H04N 9/79 |
| | | | | 348/231.99 |

FOREIGN PATENT DOCUMENTS

JP      2003-274323 A     9/2003

* cited by examiner

*Primary Examiner* — Anthony J Daniels
(74) *Attorney, Agent, or Firm* — Canon U.S.A., Inc. IP Division

(57) ABSTRACT

An image capturing apparatus including an image capturing unit, a first recording unit configured to record, in a temporary storage, a plurality of images obtained by continuous shooting performed by the image capturing unit, a second recording unit configured to record, in a recording medium, the images recorded in the temporary storage, and a control unit configured to perform control to, in a case where a first operation and a second operation by a user are accepted when an image is being recorded in the recording medium, discard the images recorded in the temporary storage and stop a process of recording the image in the recording medium.

14 Claims, 15 Drawing Sheets

IMAGE CAPTURING APPARATUS, IMAGE PROCESSING APPARATUS, IMAGE PROCESSING METHOD, AND STORAGE MEDIUM

BACKGROUND

Field

The present disclosure relates to an image capturing apparatus, an image processing apparatus, an image processing method, and a storage medium.

Description of the Related Art

According to an improvement of a continuous shooting performance of a digital camera, a number of frames of image data and an amount of data treated with one continuous shooting are increasing. In general, in a continuous shooting operation, a user predicts a movement of an object and starts a continuous shooting operation a few seconds before an expected scene would occur. After the continuous shooting is finished, a user extracts a best shot from a plurality of images obtained in the continuous shooting operation. However, there is a possibility that an expected scene does not actually occur, for example, as in a case where a user tries to capture an image of a batter in a baseball game at a moment at which the batter swings a bat to get a hit, but the batter actually misses a ball. In such a case, a large amount of unnecessary image data is written in a recording medium. Furthermore, in a period in which image data is being written in a recording medium, a next continuous shooting operation is limited, which may result in a loss of a chance of shooting.

In view of the above, Japanese Patent Laid-Open No. 2003-274323 discloses a technique in which in a case where a next shooting instruction is issued when image data is being written in a recording medium, image data in a temporary storage device is discarded and overwritten with received new image data in the temporary storage device thereby making it possible to immediately restart a continuous shooting operation.

SUMMARY

It is an object of the present disclosure to provide a technique to start shooting at appropriate timing after a previous shooting operation is completed.

According to an aspect of the present disclosure, an image processing apparatus includes an image capturing unit, a first recording unit configured to record, in a temporary storage, a plurality of images obtained by continuous shooting performed by the image capturing unit, a second recording unit configured to record, in a recording medium, the images recorded in the temporary storage, and a control unit configured to perform control to, in a case where a first operation and a second operation by a user are accepted when an image is being recorded in the recording medium, discard the images recorded in the temporary storage and stop a process of recording the image in the recording medium.

Further features will become apparent from the following description of exemplary embodiments with reference to the attached drawings.

DESCRIPTION OF THE EMBODIMENTS

Embodiments of the present disclosure are described below with reference to the drawings.

First Embodiment

Figure 1:
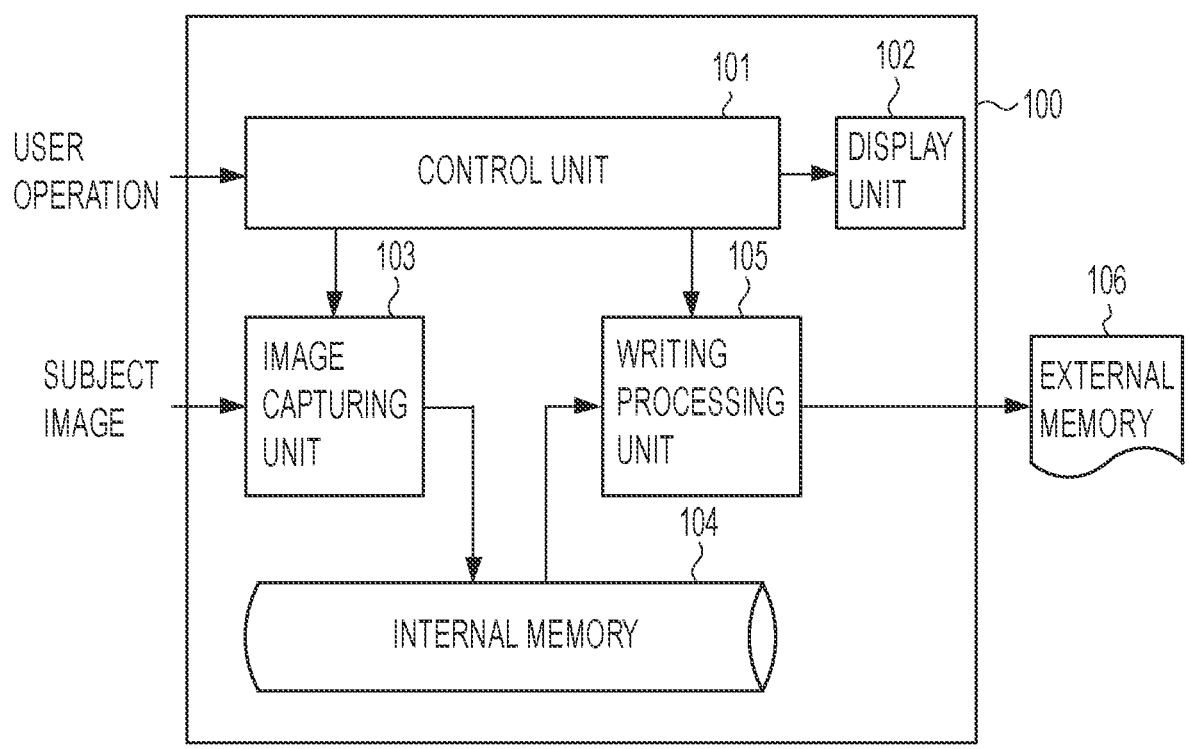
FIG. 1 is a diagram illustrating a hardware configuration of a digital camera.

FIG. 1 is a diagram illustrating a hardware configuration of a digital camera 100. The digital camera 100 is an example of an image capturing apparatus and an image processing apparatus. A control unit 101 is, for example, a CPU, and controls the digital camera 100. A display unit 102 displays various kinds of information. An image-capturing unit 103 includes an image-sensing device such as a CMOS sensor or the like configured to convert incident light to an electric signal, and an analogue-to-digital (AD) converter configured to convert an analog signal output from the image-sensing device to a digital signal. The resultant converted digital signal is stored as raw image data in an internal memory 104.

Figure 2A:
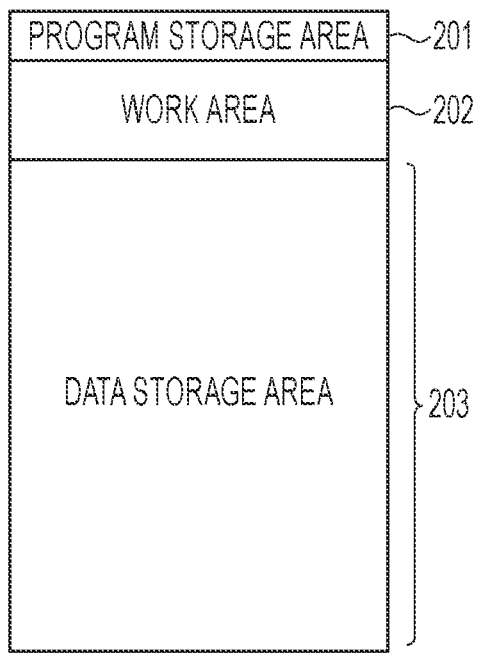
FIG. 2A is a diagram illustrating an example of a data structure of an internal memory.

The internal memory 104 is a storage medium for temporarily storing data. The internal memory 104 may be a volatile memory such as a DRAM or the like. The internal memory 104 is an example of a temporary storage device. FIG. 2A is a diagram illustrating the internal memory 104 in an initial state. As shown in FIG. 2A, the internal memory 104 is used such that a total memory area is divided into a plurality of areas. A program storage area 201 is an area for storing a program used in an operation control. A work area 202 is used as a temporary data storage area in various data processing operations. A memory area other than the program storage area 201 and the work area 202 is used as a data storage area 203. The data storage area 203 is used as a recording area for saving a plurality of pieces of raw image data acquired by the image-capturing unit 103.

A writing processing unit 105 performs various image processing operations on raw image data stored in the internal memory 104 according to a setting made in advance, and writes resultant processed image data in an external memory 106. The external memory 106 is a storage medium for permanently storing data. The external memory 106 may be a non-volatile memory such as a flash memory or the like. After the writing of the raw image data in the external memory 106 is completed, the original raw image data is deleted (discarded) from the data storage area 203. The deleting creates a free memory area, which may be used in writing new raw image data. Note that functions of the digital camera 100 or processes performed by the digital camera 100, which will be described later, are realized by the control unit 101 by reading a program stored in a storage unit such as the internal memory 104 and executing the program. In an alternative example, a process performed by the writing processing unit 105 may be performed by the control unit 101.

Figure 2B:
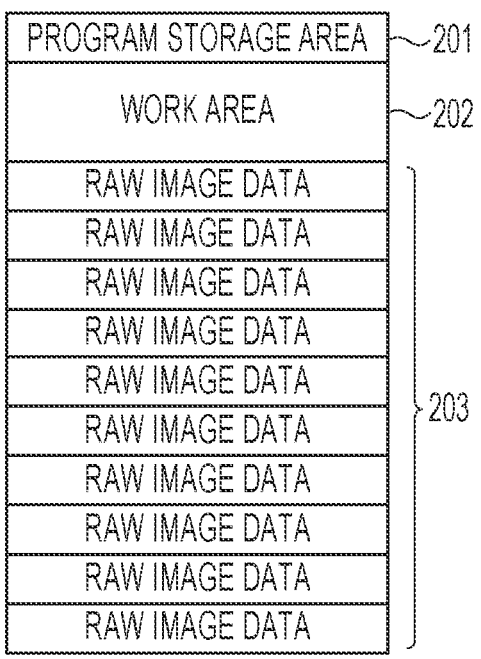
FIG. 2B is a diagram illustrating an example of a data structure in an internal memory.

A speed of writing data in the internal memory 104 by the image capturing unit 103 is higher than a speed of writing data in the external memory 106 by the writing processing unit 105. As a result, in the continuous shooting (capturing), raw image data is continuously stored in the data storage area 203, which results in an increase in an amount of raw image data in the data storage area 203. FIG. 2B is a diagram illustrating the internal memory 104 being in a write waiting state. When the data storage area 203 is full of raw image data as in the case in FIG. 2B, the control unit 101 causes the image-capturing unit 103 to stop further writing raw image data. As a result, a write wait state occurs. In the present embodiment, the digital camera 100 stops a writing process in response to a user operation performed in the write wait state. A process of stopping the writing process is described below.

Figure 3:
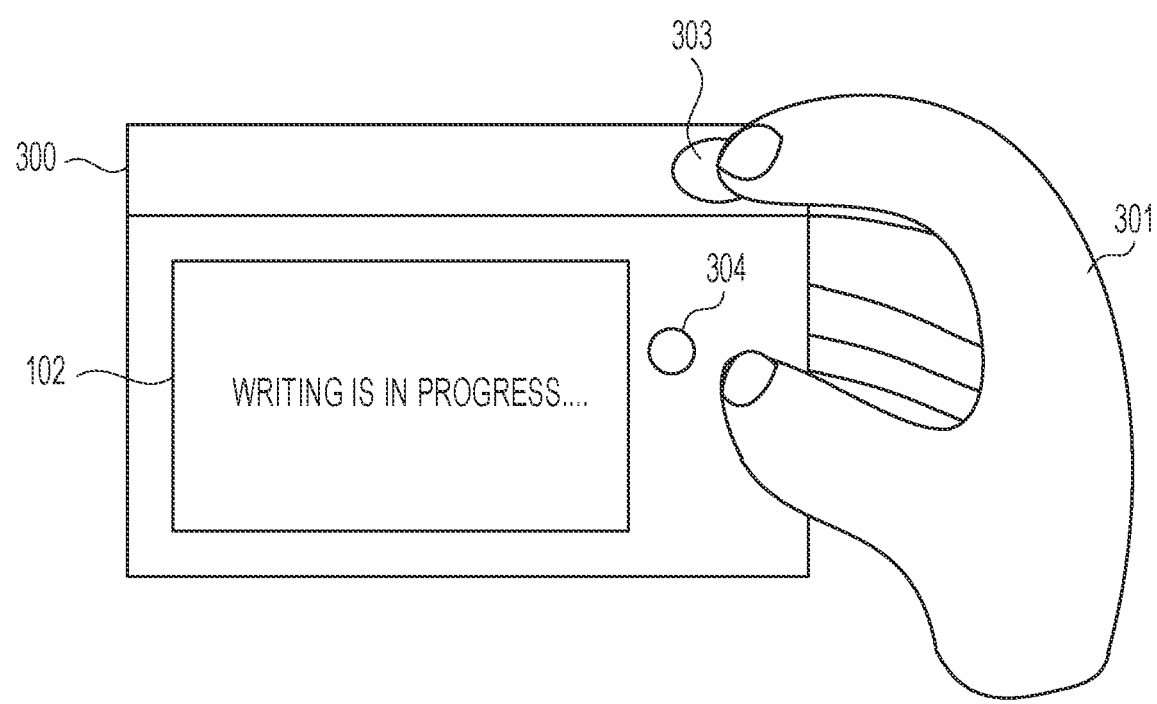
FIG. 3 is a schematic diagram illustrating a user operation.

FIG. 3 is a schematic diagram illustrating a user operation on the digital camera 100. In the example shown in FIG. 3, a case 300 of the digital camera 100 is held with a right hand 301 of a user. A display unit 102 is a display device that displays a state of the digital camera 100, a message prompting a user to perform an inputting operation. A shutter button 303 and a write stop button 304 are operation buttons used in an inputting operation by a user. As shown in FIG. 3, the shutter button 303 is disposed on an upper face of the digital camera 100. The write stop button 304 is disposed on a back face of the digital camera 100. The shutter button 303 is disposed at a location corresponding to a location of a forefinger of the right hand 301 holding the digital camera 100 in case of capturing an image. The write stop button 304 is disposed at a location corresponding to a location of a thumb of the right hand 301 holding the digital camera 100.

A user may perform four operations of issuing instructions described below with the digital camera 100:
(1) prepare-for-shooting instruction;
(2) shooting execution instruction;
(3) shooting restart instruction; and
(4) writing stop instruction.

The prepare-for-shooting instruction of (1) is an instruction to instruct the camera 100 to calculate parameters controlling an exposure, a focal length, and/or the like. The prepare-for-shooting instruction is issued when the shutter button 303 is half-pressed (pressed to a half-pressure position). The shooting execution instruction of (2) is an instruction to instruct the digital camera 100 to execute a process of writing image data. The shooting execution instruction is issued when the shutter button 303 is fully pressed (by a full pressing operation). The shooting restart instruction of (3) is an instruction to instruct the digital camera 100 to, in the write wait state, immediately start a next continuous shooting operation. The shooting restart instruction is issued when the shutter button 303 is half pressed or fully pressed (that is, the shooting restart instruction, the prepare-for-shooting instruction, and the shooting execution instruction are issued using the same shutter button 303). The writing stop instruction of (4) is an instruction to stop the process of writing to the external memory 106. The writing stop instruction is issued when the write stop button 304 is pressed after the shooting restart instruction is issued.

Figure 4:
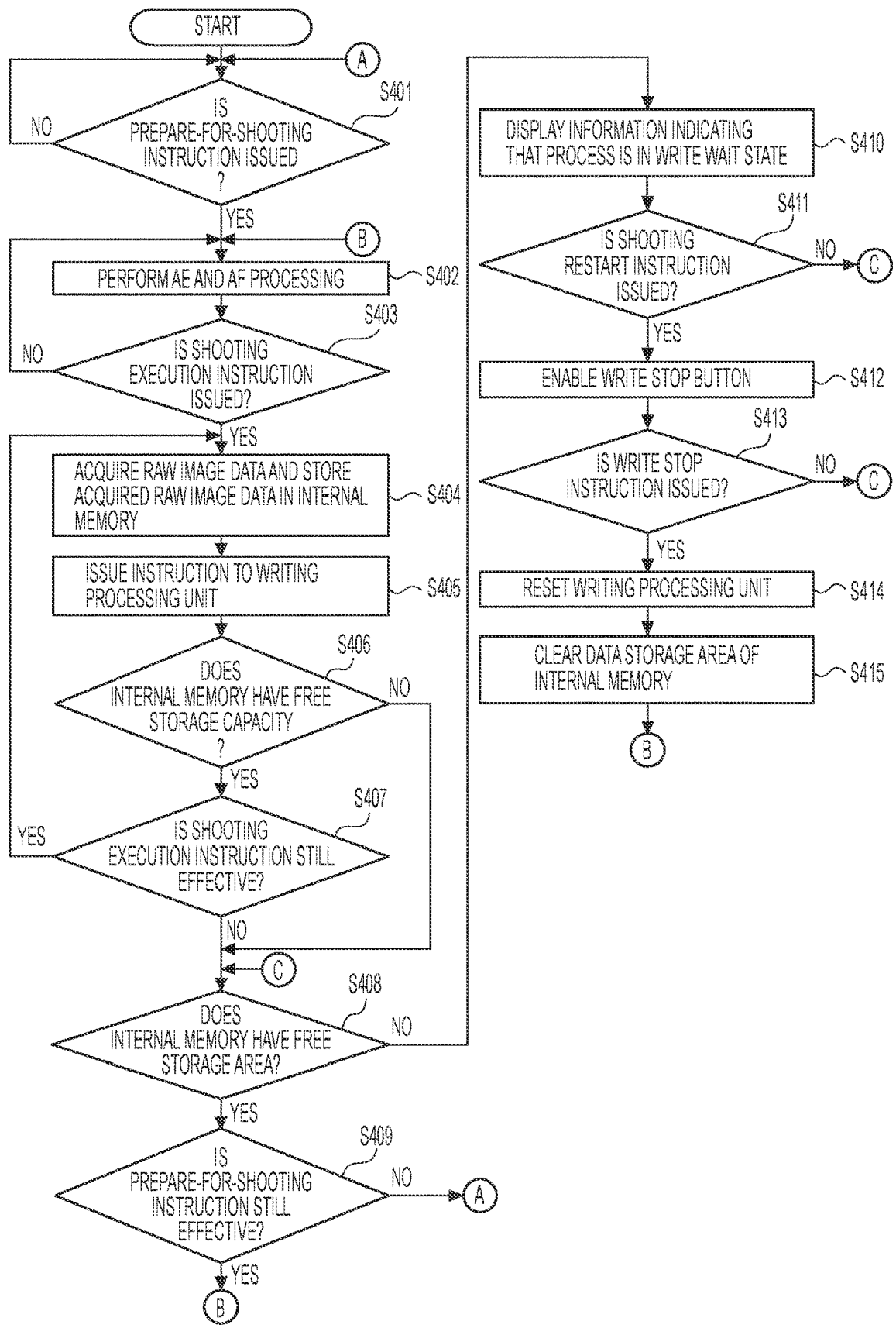
FIG. 4 is a flowchart illustrating a continuous shooting process.

FIG. 4 is a flowchart illustrating a continuous shooting process performed by the digital camera 100. In step S401, the control unit 101 determines whether the prepare-for-shooting instruction is accepted. The control unit 101 waits until the prepare-for-shooting instruction is accepted. When the prepare-for-shooting instruction is accepted (YES in step S401), the control unit 101 advances the process to step S402. In step S402, the control unit 101 calculates control parameters in terms of the exposure and the focal length. Next, in step S403, the control unit 101 determines whether the shooting execution instruction is accepted. In a case where the shooting execution instruction is accepted (YES in step S403), the control unit 101 advances the process to step S404. In a case where the shooting execution instruction is not accepted (NO in step S403), the control unit 101 advances the process to step S402.

In step S404, the control unit 101 instructs the image capturing unit 103 to acquire one frame of raw image data and store it in the internal memory 104. In response, the image capturing unit 103 records one frame of raw image data acquired by the continuous shooting in the internal memory 104. Next, in step S405, the control unit 101 instructs the writing processing unit 105 to execute a sequence of processes of writing the raw image data stored in the internal memory 104 to the external memory 106 (hereinafter, referred to as a writing process).

Figure 5:
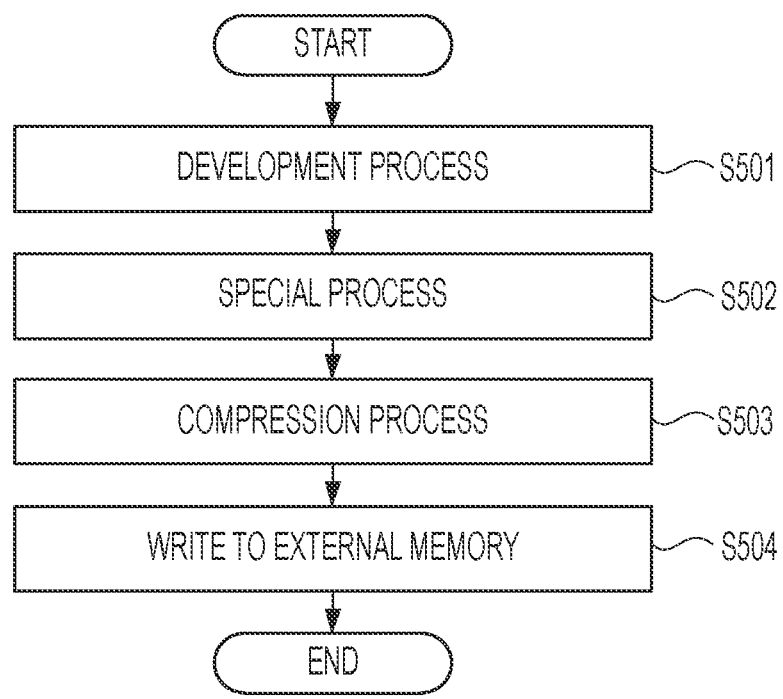
FIG. 5 is a flowchart illustrating a writing process.

Now, referring to FIG. 5, the writing process performed by the writing processing unit 105 is further described. In step S501, the writing processing unit 105 reads out one frame of raw image data from the internal memory 104 and performs a development process including a noise reduction process and an edge enhancement process on the read raw image data. Next, in step S502, the writing processing unit 105 performs a special process such as an optical correction process for suppressing an influence of aberration, a rewriting process for adjusting shading of a person in the image, and/or the like on the image data already subjected to the development process. In the optical correction process and the rewriting process, a large processing load may occur, which may cause it to take as long as a few seconds to process one frame of image data.

Next, in step S503, the writing processing unit 105 performs a compression process on the image data already subjected to the special process thereby reducing the data size of the image data. Next, in step S504, the writing processing unit 105 writes the size-reduced image data in the external memory 106. The writing processing unit 105 deletes the raw image data already written in the external memory 106 from the internal memory 104. As a result, a memory area occupied by the raw image data is available as a free memory area in a next continuous shooting operation.

The process of writing raw image data by the image capturing unit 103 and the process of writing to the external memory 106 by the writing processing unit 105 may be executed independently of each other. Therefore, after the control unit 101 issues the writing process execution instruction in step S405, the control unit 101 may execute the next step S406 (FIG. 4) without waiting for the writing processing unit 105 to finish the writing process.

Referring again to FIG. 4, in step S406, the control unit 101 determines whether the data storage area 203 of the internal memory 104 has a free memory capacity sufficient to store one or more frames of the raw image data. In a case where there is a sufficient free memory capacity (YES in step S406), the control unit 101 advances the process to step S407. In step S407, the control unit 101 determines whether the shooting execution instruction is still effective. In a case where the shooting execution instruction is still effective (YES in step S407), the control unit 101 advances the process to step S404. The control unit 101 achieves the continuous shooting by repeatedly performing step S404 to step S406. In a case where the shooting execution instruction is no longer effective (NO in step S407), the control unit 101 causes the image capturing unit 103 to end the writing of the image data in the internal memory 104, and the control unit 101 advances the process to step S408. In a state in which the process in step S408 is not started, the image-capturing unit 103 is not executing writing of raw image data in the internal memory 104, but only the process by the writing processing unit 105 is performed sequentially. As the writing process progresses, the free memory space in the internal memory 104 increases.

In step S408, the control unit 101 determines whether the internal memory 104 has a free memory space sufficient to start a next shooting operation. More specifically, in a case where the free memory space in the internal memory 104 is greater than or equal to a predetermined threshold value, the control unit 101 determines that the free memory space is sufficient to start the shooting operation. However, in a case where the free memory space is smaller than the threshold value, the control unit 101 determines that the free memory space is not sufficient to start the shooting operation. In a case where the free memory space is sufficient to start the shooting operation, (YES in step S408), the control unit 101 advances the process to step S409. However, in a case where the free memory space is not sufficient to start the shooting operation (NO in step S408), the control unit 101 advances the process to step S410. In step S409, the control unit 101 determines whether the prepare-for-shooting instruction is still effective. In a case where the prepare-for-shooting instruction is still effective (YES in step S409), the control unit 101 advances the process to step S402. In a case where the prepare-for-shooting instruction is no longer effective (NO in step S409), the control unit 101 advances the process to step S401.

In step S410, the control unit 101 performs control to display information indicating that the process is in a write wait state on the display unit 102. More specifically, for example, the control unit 101 displays, on the display unit 102, a message indicating that the writing process is in progress as shown in FIG. 3. This process is an example of a display control process. Next, in step S411, the control unit 101 determines whether the shooting restart instruction is accepted. In the present embodiment, the control unit 101 is capable of accepting the shooting restart instruction even in the write wait state. In a case where the shooting restart instruction is accepted (YES in step S411), the control unit 101 advances the process to step S412. In a case where the shooting restart instruction is not accepted (NO in step S411), the control unit 101 advances the process to step S408.

In step S412, the control unit 101 enables the operation of the write stop button 304, that is, the operation of inputting the writing stop instruction. Furthermore, the control unit 101 performs control such that information indicating that the write stop button is enabled is displayed on the display unit 102. More specifically, for example, a message is displayed to inform that it may be possible to stop the writing process by pressing the write stop button 304 and to thereby start a next continuous shooting. Note that the control unit 101 may perform control such that the operation of the write stop button 304 is enabled only for a period with a predetermined length, for a few seconds for example, after the shooting restart instruction is accepted. Next, in step S413, the control unit 101 determines whether the writing stop instruction is accepted while the write stop button 304 is enabled. In a case where the writing stop instruction is accepted (YES in step S413), the control unit 101 advances the process to step S414. In a case where the writing stop instruction is not accepted (NO in step S413), the control unit 101 advances the process to step S408.

In step S414, the control unit 101 performs control such that the writing processing unit 105 is reset and the process of writing to the external memory 106 is stopped. This process is an example of a control process of stopping the process of recording to the temporary storage device. Next, in step S415, the control unit 101 clears the data storage area 203 of the internal memory 104 such that the whole data storage area 203 is available as a free memory space. Thereafter, the control unit 101 advances the process to step S402 to restart the continuous shooting.

In the digital camera 100 according to the present embodiment, as described above, even in the middle of the process in which a series of pieces of image data acquired by a continuous shooting process is being written in the external memory 106, if the write stop instruction is accepted from a user, the digital camera 100 may immediately start a next continuous shooting operation.

In digital cameras according to the conventional technique, in a write wait state, any user operation is not accepted until the data storage area 203 has a free memory capacity greater than a particular value. Therefore, when a process such as a special process or the like in which a large processing load occurs is performed, there is a possibility that it takes as long as several seconds until it is possible to perform a next operation. Furthermore, in the conventional technique, even in a state in which it may restart an operation after a free memory capacity is available, the number of frames of images that can be captured is limited depending on the available free memory capacity of the internal memory, and thus it was not possible for the digital cameras equipped with a continuous shooting function to make the most of the performance thereof unless the writing process is completed.

In contrast, in the digital camera 100 according to the present embodiment, even in the write wait state after the continuous shooting, it is possible to start a next continuous shooting immediately after a user issues the write stop instruction. Furthermore, in the digital camera 100 according to the present embodiment, recording of images to the recording medium is stopped when two operations, that is, a first operation and a second operation, are performed. The first operation is an operation to issue the shooting restart instruction. The second operation is an operation to issue the writing stop instruction. This prevents image data from being deleted unintentionally during a writing process by a wrong operation. That is, it is possible to avoid an erroneous operation in a cancellation operation performed to stop recording an image in the recording medium.

Second Embodiment

Next, a digital camera 100 according to a second embodiment is described below. In the digital camera 100 according to the second embodiment, a user may perform operations to issue the following three instructions:
(A) writing stop instruction;
(B) writing cancellation instruction; and
(C) setting-of-writing change instruction.
The writing stop instruction of (A) is an instruction to stop a writing process as in the first embodiment. The writing cancellation instruction of (B) is an instruction to stop writing to the external memory 106 and delete all image data already written in the external memory 106. The setting-of-writing change instruction of (C) is an instruction to change, in the middle of a writing process, a setting of image processing performed on raw image data.

Figure 6:
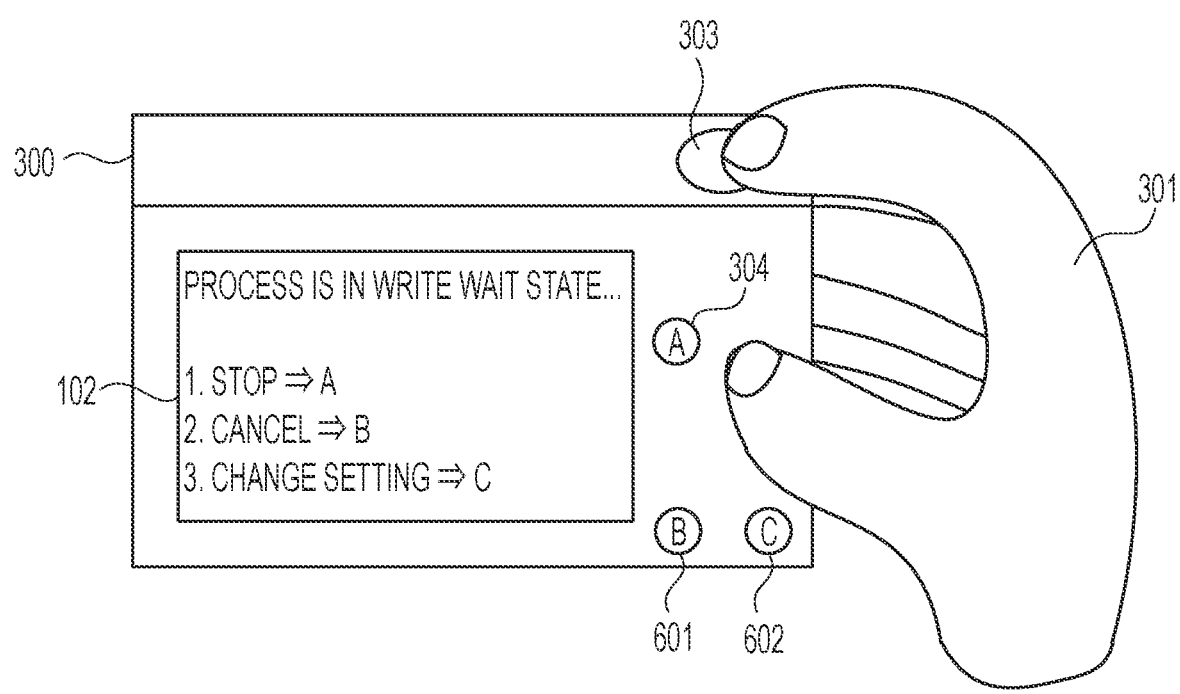
FIG. 6 is a schematic diagram illustrating a user operation.

FIG. 6 is a schematic diagram illustrating a user operation on the digital camera 100. In the second embodiment, a writing cancellation button 601 and a setting-of-writing change button 602 are provided on a case 300 in addition to a shutter button 303 and a write stop button 304 similar to those described in the first embodiment. The writing cancellation button 601 is disposed on the same side of the location of the shutter button 303 and is located farther away from a location corresponding to a position of a thumb of a right hand than the write stop button 304. The writing cancellation instruction is issued when the writing cancellation button 601 is pressed. The setting-of-writing change instruction is issued when the setting-of-writing change button 602 is pressed.

Figure 7:
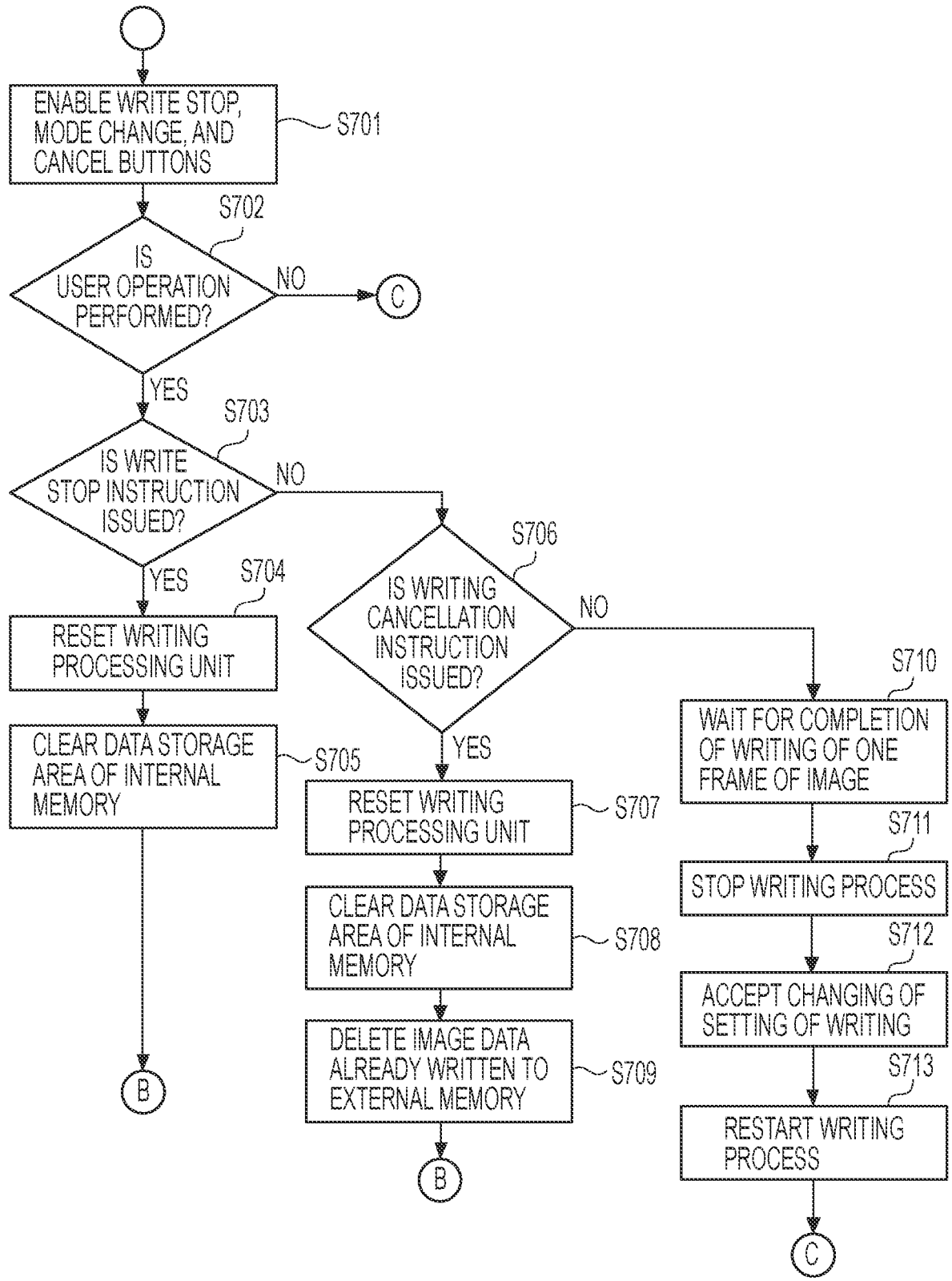
FIG. 7 is a flowchart illustrating a continuous shooting process.

FIG. 7 is a flowchart illustrating a continuous shooting process performed by the digital camera 100 according to the second embodiment. In the continuous shooting process according to the second embodiment, the control unit 101 performs a process similar to that in step S401 to step S411 shown in FIG. 4. In a case where the shooting restart instruction is accepted in step S411, the control unit 101 advances the process to step S701 shown in FIG. 7. In step S701, the control unit 101 enables operations of buttons of the writing stop instruction, the writing cancellation instruction, and the setting-of-writing change instruction. Note that the control unit 101 may enable the operations of these buttons only for a predetermined time after the shooting restart instruction is issued. Furthermore, as shown in FIG. 6, the control unit 101 displays a message on the display unit 102 to notify a user that inputting operations are enabled, and thus it is possible to perform stopping writing, cancelling writing, and changing setting of wiring by performing corresponding input operations. The control unit 101 may also display a message indicating that when one of these operations is performed, it is possible to perform a continuous shooting operation.

Next, in step S702, the control unit 101 determines whether a user operation is accepted within an effective period. In a case where a user operation is accepted (YES in step S702), the control unit 101 advances the process to step S703. In a case where no user operation is accepted (NO in step S702), the control unit 101 advances the process to step S408 (FIG. 4). In step S703, the control unit 101 determines whether the writing stop instruction is accepted. In a case where the writing stop instruction is accepted (YES in step S703), the control unit 101 advances the process to step S704. In a case where the writing stop instruction is not accepted (NO in step S703), the control unit 101 advances the process to step S706.

In step S704, the control unit 101 resets the writing processing unit 105 and stops the process of writing to the external memory 106. Next, in step S705, the control unit 101 clears the data storage area 203 of the internal memory such that the whole data storage area 203 becomes available as a free memory space. Note that step S704 and step S705 are similar to step S414 and step S415. After step S705, the control unit 101 advances the process to step S402 to restart the continuous shooting.

In step S706, the control unit 101 determines whether the writing cancellation instruction is accepted. In a case where the writing cancellation instruction is accepted (YES in step S706), the control unit 101 advances the process to step S707. In a case where the writing cancellation instruction is not accepted (NO in step S706), the control unit 101 advances the process to step S710. Note that step S707 and step S708 are similar to step S414 and step S415. After step S708, in step S709, the control unit 101 deletes all image data written in the external memory 106. The deleting of image data written in the external memory 106 may be realized by resetting the memory area as an area in which the image data may be overwritten.

In a case where the setting-of-writing change instruction is accepted, the control unit 101 advances the process to step S710. In step S710, the control unit 101 waits until the writing processing unit 105 finishes the process of writing one frame of image data. Thereafter, in step S711, the control unit 101 instructs the writing processing unit 105 to stop the execution of the writing process. In accordance with the instruction, the writing processing unit 105 stops the writing process. Next, in step S712, the control unit 101 displays, on the display unit 102, information indicating input operations allowed to be performed to change setting of writing, thereby prompting a user to perform inputting for changing the setting of writing.

Figure 8:
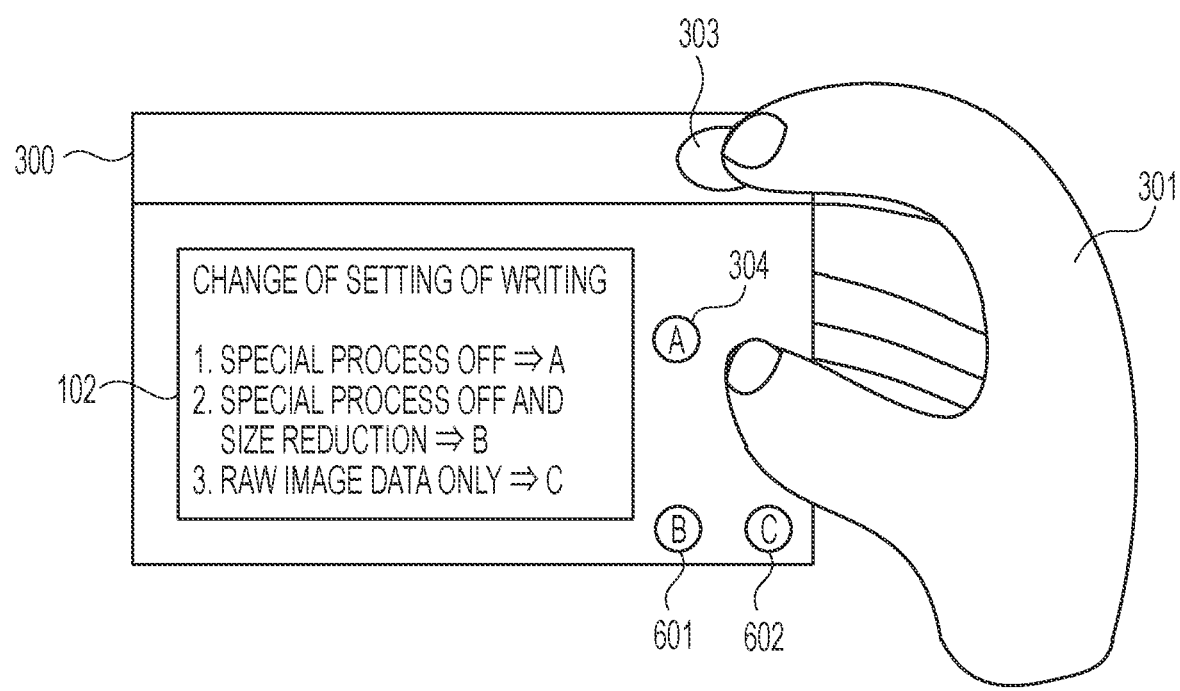
FIG. 8 is a schematic diagram illustrating a user operation.

The input operation may be performed to change the setting to one of the following three writing conditions as shown in FIG. 8:
(1) special process OFF;
(2) special process OFF+size reduction; and
(3) raw image data only.
In a case where the special process OFF of (1) is selected, the special process (step S502) in the writing process shown in FIG. 5 is skipped without being executed. Although this may cause a partial reduction in quality of image data, a reduction in the processing time for the writing process is achieved. This makes it possible to restart the operation in a shorter time from the write wait state.

In a case where the special process OFF+size reduction of (2) is selected, the image size of image data is reduced in the development process (step S501) and resultant developed image data is output. As a result, a reduction is achieved in the processing time for the processes performed after step S502. Thus, a further reduction in a writing wait period is achieved compared with the case of the special process OFF.

In a case where the raw image data only of (3) is selected, the process from step S501 to step S503 in the writing process is skipped, and raw image data is directly written in the external memory 106. In this case, the data size of data subjected to writing is not reduced, and thus an increase occurs in the processing time taken to write the data to the external memory (step S504). However, the total processing time for the writing process is reduced compared with the case in which the special process is ON, and thus a reduction in the write waiting time is achieved. Note that the writing process described above may be performed on the data later after the data is stored as the raw image data in the external memory 106. This may be useful when it is desired to quickly start a next continuous shooting operation while keeping all image data obtained in a previous continuous shooting operation.

Referring again to FIG. 7, in step S713 after step S712, the control unit 101 reflects the setting of writing, specified to be changed by the setting-of-writing change instruction input in step S712, on the writing processing unit 105. Thereafter, the control unit 101 restarts the writing process. After the process in step S713, the control unit 101 advances the process to step S408. Note that a configuration of the digital camera 100 and the process performed by the digital camera 100 according to the second embodiment are the same as the configuration of the digital camera 100 and the process performed by the digital camera 100 according to the first embodiment.

As described above, the digital camera 100 according to the second embodiment is capable of not only stopping the writing process in the write wait state but also cancelling writing of all captured images in the external memory 106. Furthermore, the ability of the digital camera 100 to change the setting of the writing process makes it possible to reduce the write waiting time while maintaining desired image data information.

Furthermore, as illustrated in FIG. 6, the writing cancellation button 601 is disposed at a location farther apart from the position of a thumb of a right hand 301 than the write stop button 304. This ensures that image data written in the external memory 106 is prevented from being deleted unintentionally by a wrong operation.

As described above, according to the first embodiment or the second embodiment, it is possible to avoid an erroneous operation in a cancellation operation performed to stop recording an image in the recording medium.

Third Embodiment

Figure 9:
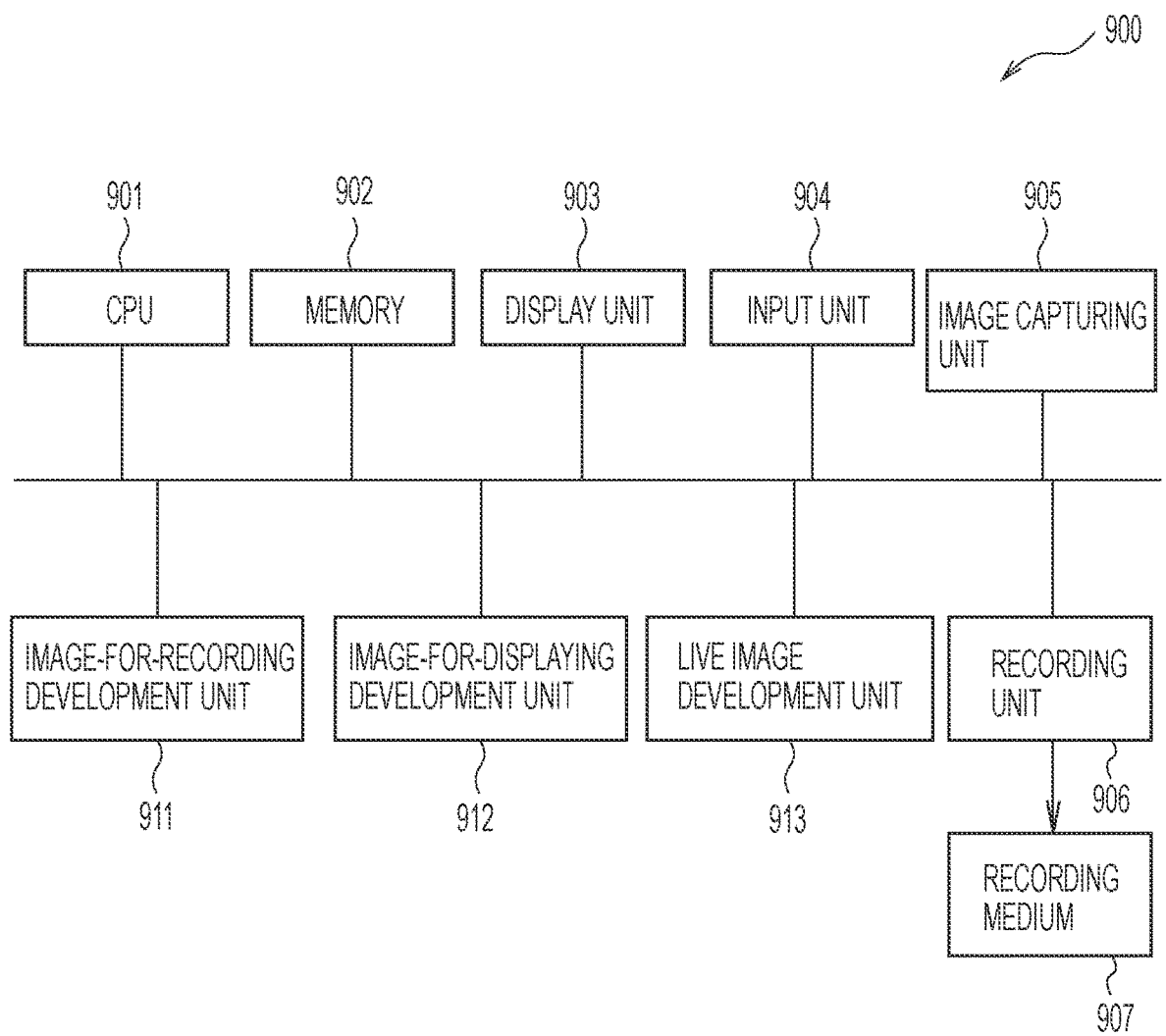
FIG. 9 is a diagram illustrating a hardware configuration of an image capturing apparatus according to a third embodiment.

FIG. 9 is a diagram illustrating a hardware configuration of an image capturing apparatus 900 according to a third embodiment. The image capturing apparatus 900 is an example of an image processing apparatus. The image capturing apparatus 900 includes a CPU 901, a memory 902, a display unit 903, an input unit 904, an image-capturing unit 905, an image-for-recording development unit 911, an image-for-displaying development unit 912, a live image development unit 913, a recording unit 906, and a recording medium 907. The CPU 901 reads out a control program stored in the memory 902 and executes various processes. The memory 902 is used by the CPU 901 as a temporary storage area such as a main memory and a work area. The memory 902 is a temporary storage device realized, for example, by a volatile memory such as a DRAM or the like. Note that functions of the image capturing apparatus 900 or processes performed by the image capturing apparatus 900, which will be described later, are realized by the CPU 901 by reading a program stored in the memory 902 and executing the program. The display unit 903 displays various kinds of information. The input unit 904 accepts various operations performed by a user. The image-capturing unit 905 senses an image.

The image-for-recording development unit 911 performs an image-for-recording development process to obtain an image to be recorded (image for recording). The image-for-displaying development unit 912 performs an image-for-displaying development process to obtain an image to be displayed (image for displaying) in a period in which recording of the image is not finished. The amount of calculation in the image-for-displaying development process is smaller than that in the image-for-recording development process. The live image development unit 913 performs a live image development process to obtain a live image to be displayed. The recording unit 906 records, to the recording medium 907, the image for recording obtained as a result of development in the image-for-recording development process. The recording medium 907 is realized, for example, by a non-volatile memory such as an SD card or the like. Note that each block shown in FIG. 1 may be realized using a dedicated circuit or a general-purpose processor. Note that functions of a plurality of blocks may be realized by one circuit or processor.

Figure 10:
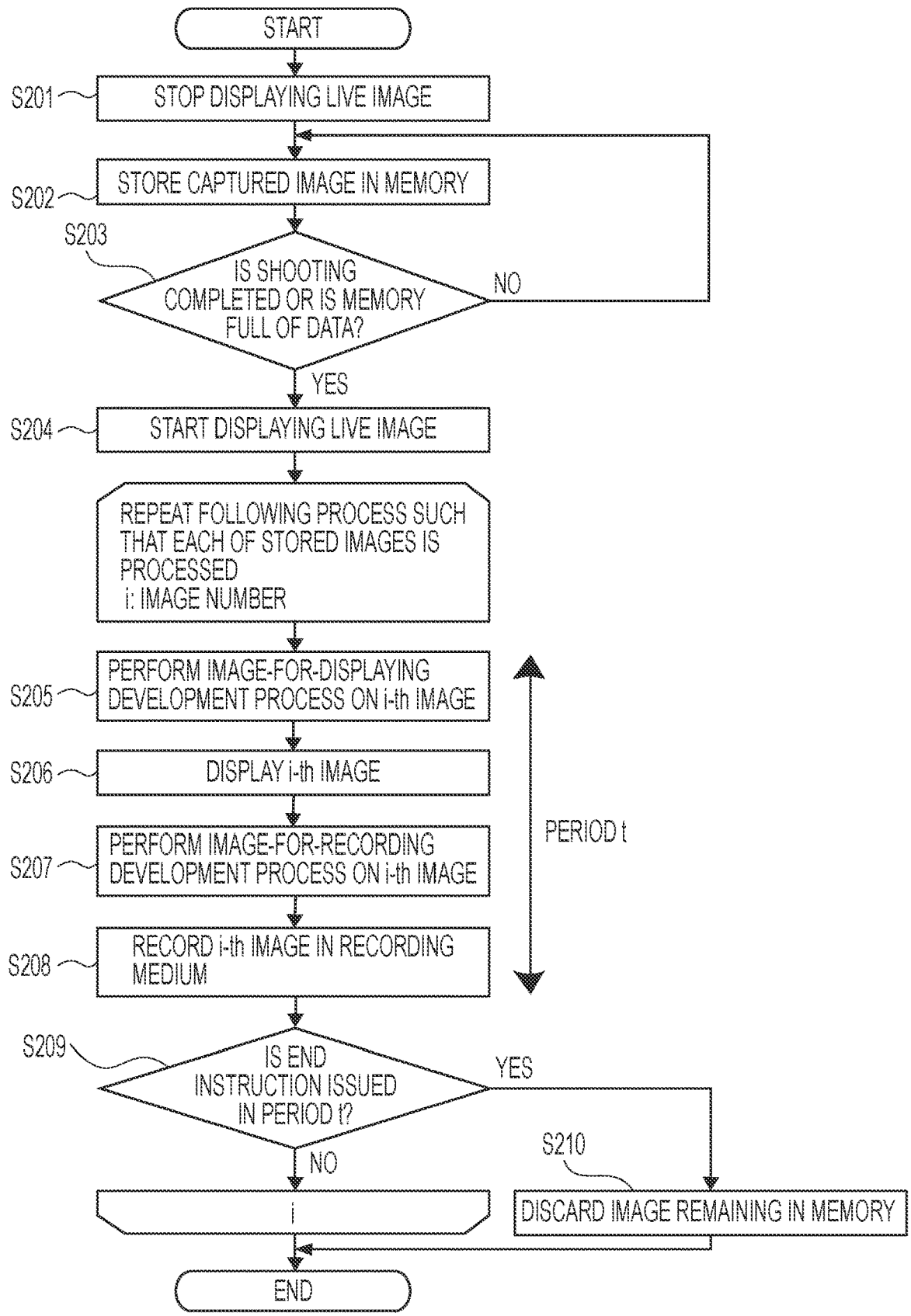
FIG. 10 is a flowchart illustrating a continuous shooting process.

FIG. 10 is a flowchart illustrating a continuous shooting process performed by the image capturing apparatus 900. The continuous shooting process is executed when the CPU 901 accepts a start instruction in response to pressing a shutter release button or the like by a user. In step S201, the CPU 901 performs control such that displaying of the live image is stopped. Next, in step S202, the CPU 901 stores (records) sequentially captured images obtained by the image-capturing unit 905 in the memory 902. Next, in step S203, the CPU 901 determines whether the shooting operation is finished or the memory 902 has no more free memory space. In a case where the shooting operation is finished or the memory 902 has no more free memory space (YES in step S203), the CPU 901 advances the process to step S204, but otherwise (NO in step S203), the CPU 901 repeatedly performs the process in step S202 to store images. In step S204, the CPU 901 restarts displaying the live image. In response, the live image development unit 913 restarts the live image development process.

Next, the CPU 901 repeatedly performs a loop process including steps S205 to S209 on respective images stored in the memory 902. First, in step S205, the CPU 901 performs control such that an i-th image to be processed is selected and the image-for-displaying development process is performed on the i-th image. In response, the image-for-displaying development unit 912 performs the image-for-displaying development process. Next, in step S206, the CPU 901 performs control such that the image for displaying obtained by the image-for-displaying development process is displayed together with the live image on the display unit 903. This process is an example of a displaying control process. Specific examples of information to be displayed will be described later. Next, in step S207, the CPU 901 performs control such that the image-for-recording development process is performed. In response, the image-for-recording development unit 911 performs the image-for-recording development process. Next, in step S208, the CPU 901 performs control such that the image for recording obtained by the image-for-recording development process is recorded in the recording medium 907. In the flowchart shown in FIG. 10, after the CPU 901 performs the image-for-displaying development process in step S205 and the image displaying process in step S206, the CPU 901 performs the image-for-recording development process in step S207 and the process of recording to recording medium in step S208. However, the image-for-displaying development process and the image-for-recording development process are respectively executed by different circuits (the image-for-displaying development unit 912 and the image-forrecording development unit 911), and thus the image-for-displaying development process and the image-for-recording development process may be executed in parallel by the respective circuits. In a case where the image-for-displaying development process and the image-for-recording development process are executed in parallel on the same image, the amount of calculation for the displaying control process is smaller than for the image-for-recording development process, and thus the displaying control process is completed earlier than the image-for-recording development process. Thus, the image displaying process in step S206 is executed earlier than the image-for-recording development process in step S207 is finished, and an image for displaying obtained by the image-for-displaying development process in step S205 is displayed on the display unit 903 in the middle of the image-for-recording development process in step S207 or the recording process in step S208.

Next, in step S209, the CPU 901 determines whether an end instruction is accepted in response to a user operation performed in an immediately previous processing period t from step S205 to step S208. In a case where the end instruction is accepted (YES in step S209), the CPU 901 advances the process to step S210. In a case where the end instruction is not accepted (NO in step S209), the CPU 901 finishes the process for the i-th image and returns the process to step S205. In step S205, the CPU 901 selects a new unprocessed image and repeats the process on the selected image. In step S210, the CPU 901 discards images stored in the memory 902 and ends the continuous shooting process after the loop process from step S205 to step S209 is completed. After the sequence is finished, it is possible to immediately start a next continuous shooting operation.

Figure 11A:
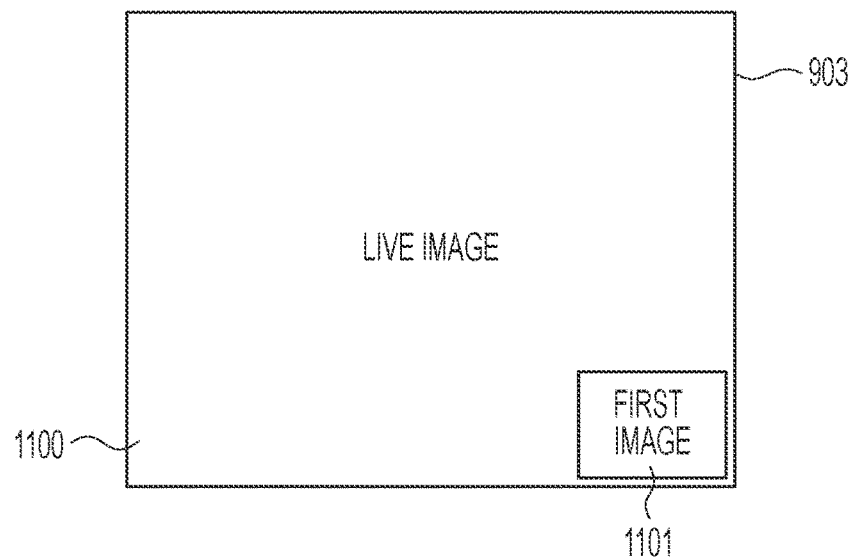
FIG. 11A is a diagram illustrating a display example.
Figure 11B:
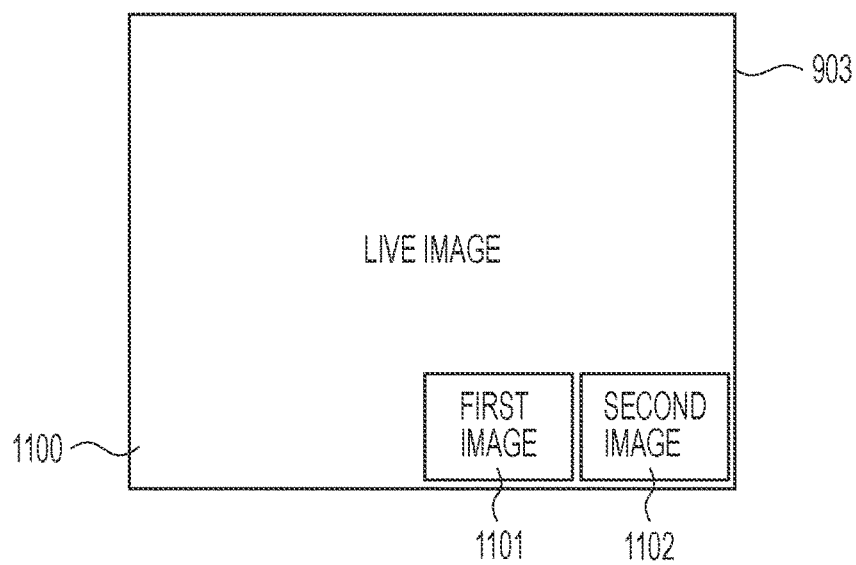
FIG. 11B is a diagram illustrating a display example.
Figure 11C:
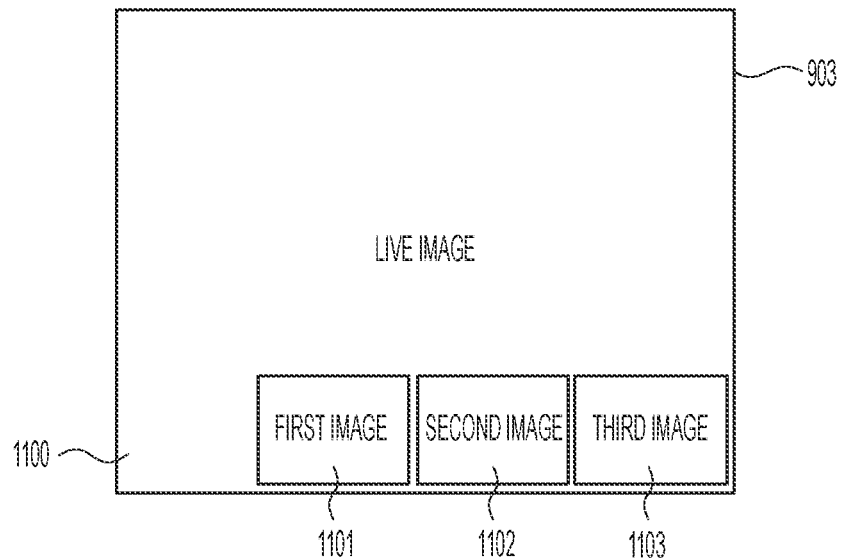
FIG. 11C is a diagram illustrating a display example.

FIGS. 11A to 11D are diagrams each illustrating a display example in step S206. For example, let it be assumed that a first image, a second image, and a third image are obtained in this order in a continuous shooting operation. In this case, in a period in which the image-for-recording development process is performed for the first image, an image-for-displaying 1101 of the first image is displayed such that it is superimposed on a live image 1100 as shown in FIG. 11A. Thereafter, when the recording of an image-for-recording of the first image to the recording medium 907 is completed and the image-for-recording development process on the second image is started, an image-for-displaying 1102 of the second image is displayed such that it is superimposed on the live image 1100 as shown in FIG. 11B. In this state, the image-for-displaying 1101 of the first image whose process is already completed remains displayed. When the recording of an image for recording of the second image to the recording medium 907 is completed and the image-for-recording development process on the third image is started, an image-for-displaying 1103 of the third image is displayed such that it is superimposed on the live image 1100 as shown in FIG. 11C. In this state, the image-for-displaying 1101 of the first image and the image-for-displaying 1102 of the second image whose processes are both already completed remain displayed. As described above, the CPU 901 selects a predetermined number, N, of latest images for displaying that have occurred before a current in-processing image.

Figure 11D:
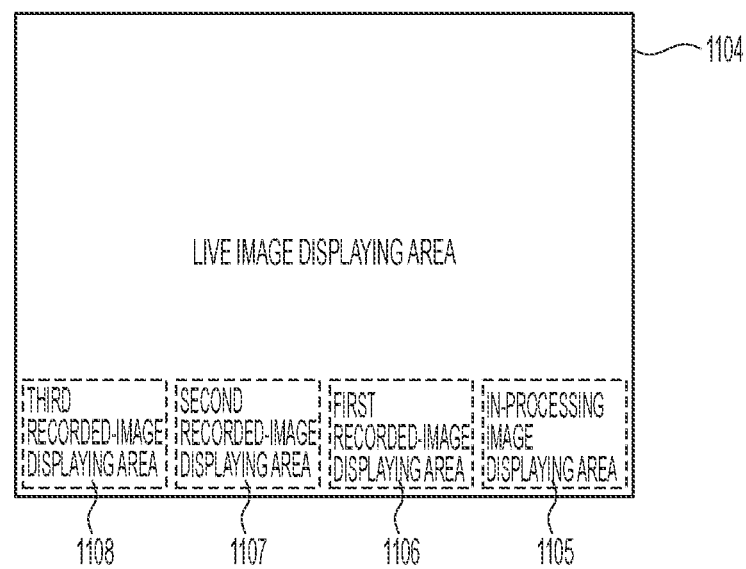
FIG. 11D is a diagram illustrating a display example.

In the present embodiment, as shown in FIG. 11D, the whole display area of the display unit 903 is used as a live image displaying area 1104 for displaying the live image 1100. An image being processed (in the middle of the image-for-recording development process in step S207 or the recording process in step S208) is displayed in the in-processing image displaying area 1105 such that it is superimposed on the live image displayed in the live image displaying area 1104. When the recording process is completed, the image for displaying which has been displayed until this moment in the in-processing image displaying area 1105 is displayed in a first recorded-image displaying area 1106 adjacent to the in-processing image displaying area 1105. After the recording process is completed, the image for displaying which has been displayed until the moment of the completion of the recording process in the first recorded-image displaying area 1106 is displayed in the second recorded-image displaying area 1107 adjacent to the first recorded-image displaying area 1106. Furthermore, after the recording process is completed, the image for displaying which has been displayed until the moment of the completion of the recording process in the second recorded-image displaying area 1107 is displayed in the third recorded-image displaying area 1108 adjacent to the second recorded-image displaying area 1107.

As described above, each time the recording process is completed for an image, the displaying area in which the image-for-displaying is displayed is changed in the order the in-processing image displaying area 1105→the first recorded-image displaying area 1106→the second recorded-image displaying area 1107→the third recorded-image displaying area 1108. The image for displaying is not displayed in the in-processing image displaying area 1105 until the recording process is completed and the development process for the next image is completed and the image-for-displaying of the next image is acquired. Therefore, the CPU 901 may change the displaying location of the image for displaying not when the recording process is completed but when the image-for-displaying development process of a next image is completed. Alternatively, the CPU 901 may display a text message such as "development in progress" or may display a solid black image in the in-processing image displaying area 1105 until the recording process is completed and the development process for a next image is completed and thus the image-for-displaying for the next image is acquired.

In the examples shown in FIGS. 11A to 11D, the CPU 901 displays the in-processing image displaying area 1105 and the recorded-image displaying areas 1106 to 1108 such that they have the same size. However, an image being processed will not be recorded in the recording medium if the stop instruction is accepted. Therefore, taking this into account, the CPU 901 may display displaying areas such that the in-processing image displaying area 1105 has a size different from sizes of the recorded-image displaying areas 1106 to 1108. For example, the in-processing image displaying area 1105 may be smaller in size than the recorded-image displaying areas 1106 to 1108. This makes it possible to easily distinguish between recorded images and a not-recorded image. Alternatively, the CPU 901 may perform image processing on the image-for-displaying displayed in the in-processing image displaying area 1105 such that the image for displaying has a color or a luminance indicating that it is in processing and is not yet recorded. Alternatively, the CPU 901 may display the in-processing image displaying area 1105 and the recorded-image displaying areas 1106 to 1108 such that the in-processing image displaying area 1105 has a frame different in color or shape from the recorded-image displaying areas 1106 to 1108 thereby making it possible to distinguish between the recorded images and the not-recorded image with ease.

As described above, in the present embodiment, in a period before recording to a recording medium is completed, the image capturing apparatus 900 displays images in processing, that is, not-recorded images. This makes it possible for a user to recognize for which images the recording process is completed and for which images the recording process is not yet completed. Thus, the user may issue a stop instruction to stop the recording process when the user wants to stop. When the CPU 901 of the image capturing apparatus 900 accepts the stop instruction, the CPU 901 performs control according to the stop instruction such that images stored in the memory are deleted, and the image-for-displaying development process, the image-for-recording development process, and the recording in the recording medium are stopped. These processes are examples of an accepting process and a stopping process.

As described above, in the present embodiment, the image capturing apparatus 900 is capable of stopping the process associated with the recording to the recording medium at a time a user wants. Therefore, for example, when images following a particular image of interest are not necessary, the user may perform an operation to issue an instruction to stop the process for the images following the image of interest. In response, the CPU 901 may stop the process at a desired timing and may start a next continuous shooting operation.

In the third embodiment, the image-for-recording development unit 911 and the image-for-displaying development unit 912 are different circuits, and the respective circuits execute the image-for-recording development process and the image-for-displaying development process. However, in a first modification of the third embodiment, the image-for-recording development unit and the image-for-displaying development unit may share partly or entirely a circuit, and the circuit may execute the image-for-recording development process and the image-for-displaying development process in a time sharing manner. In an alternative example, the CPU 901 may read a program stored in the memory 902 and may perform the processes of the image-for-recording development unit and the image-for-displaying development unit by executing the program.

In a second modification, the image capturing apparatus 900 may display an image for displaying when at least one of the image-for-recording development process and the image-for-recording recording process is being executed.

Figure 12:
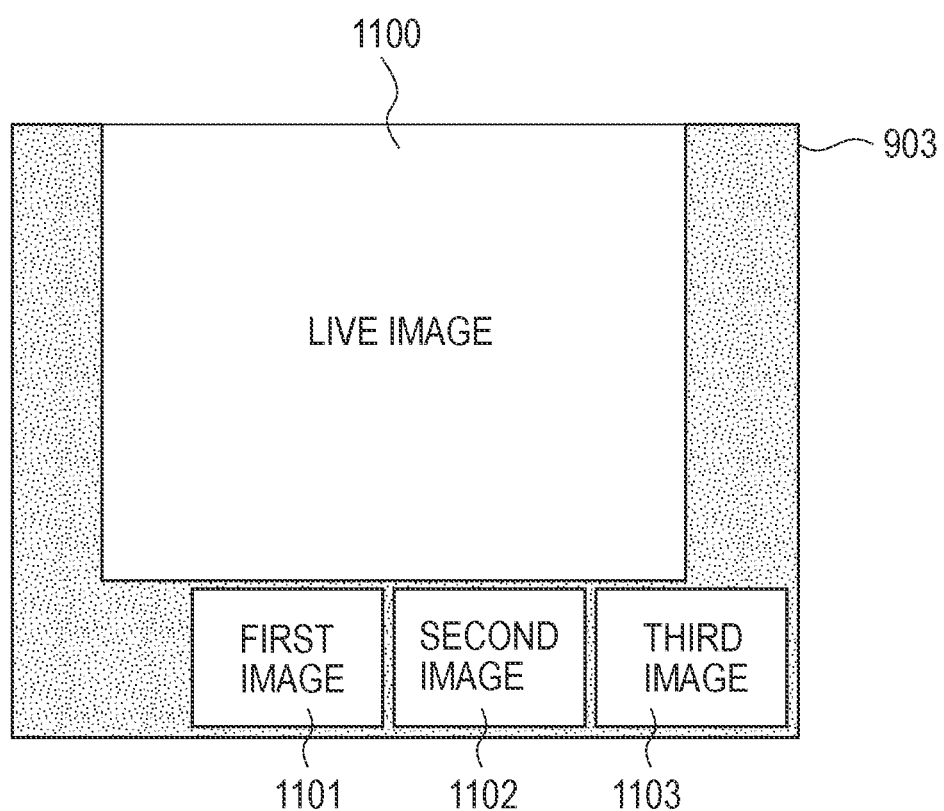
FIG. 12 is a diagram illustrating a display example.
Figure 13A:
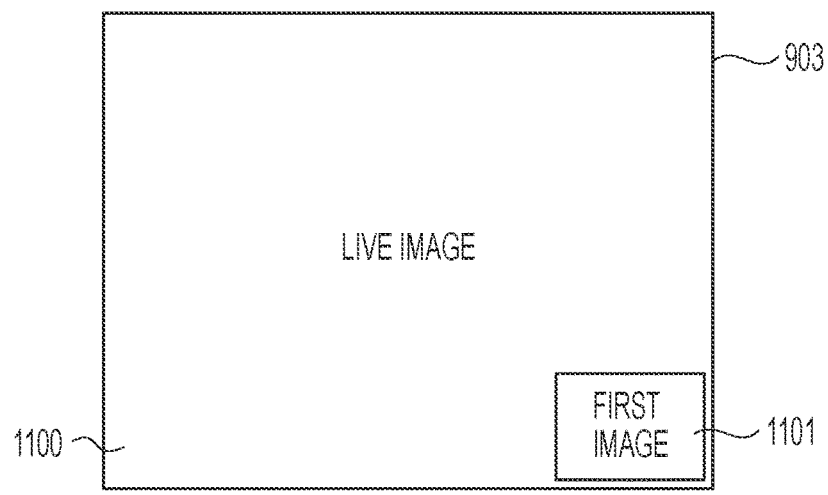
FIG. 13A is a diagram illustrating a display example.
Figure 13B:
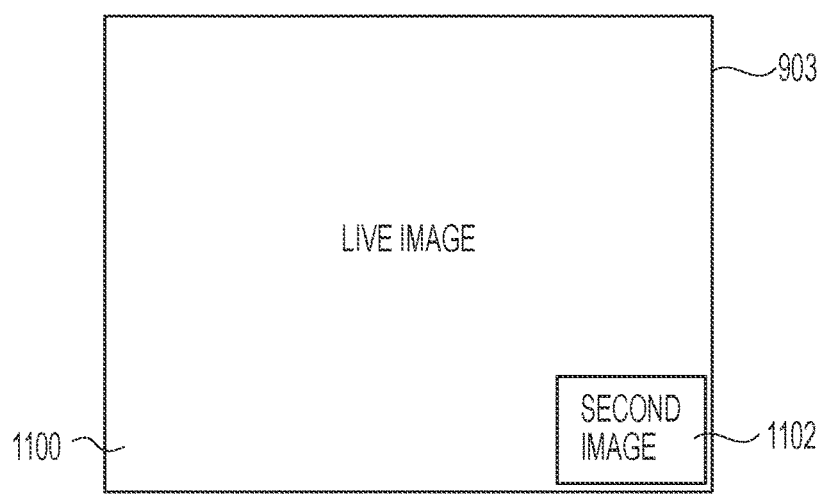
FIG. 13B is a diagram illustrating a display example.
Figure 13C:
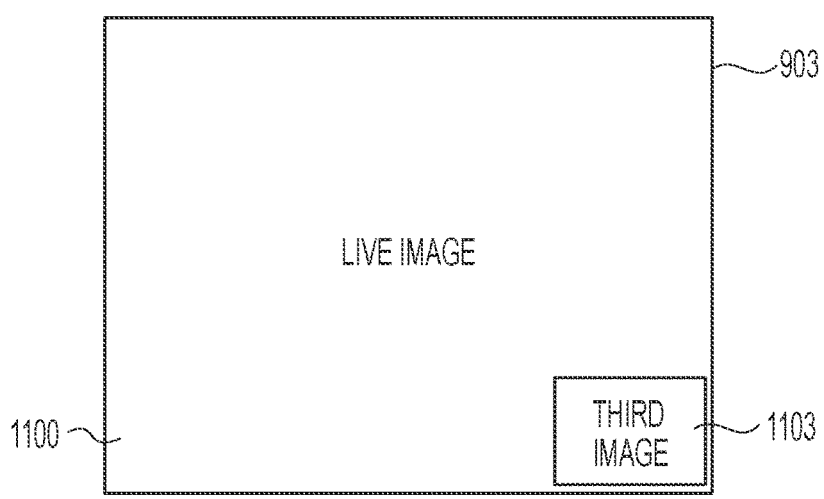
FIG. 13C is a diagram illustrating a display example.

In a third modification, in the image capturing apparatus 900, the manner of displaying an image-for-displaying is not limited to the examples according to the embodiments described above, as long as the image-for-displaying is displayed. For example, as shown in FIG. 12, the image capturing apparatus 900 may display a live image 1100 and images-for-displaying 1101, 1102, and 1103 at the same time in different areas of the display unit 903. In an alternative example, as for displaying of the live image 1100, as shown in FIGS. 13A to 13C, the image capturing apparatus 900 may display only an image-for-displaying of an image being processed as an image superimposed on the live image 1100. More specifically, when a first image is being processed, the image capturing apparatus 900 may display an image-for-displaying 1101 of the first image as shown in FIG. 13A. When a second image is being processed, the image capturing apparatus 900 may display only an image-for-displaying 1102 of the second image as shown in FIG. 13B. When a third image is being processed, the image capturing apparatus 900 may display only an image-for-displaying 1103 of the third image as shown in FIG. 13C.

Fourth Embodiment

Figure 14:
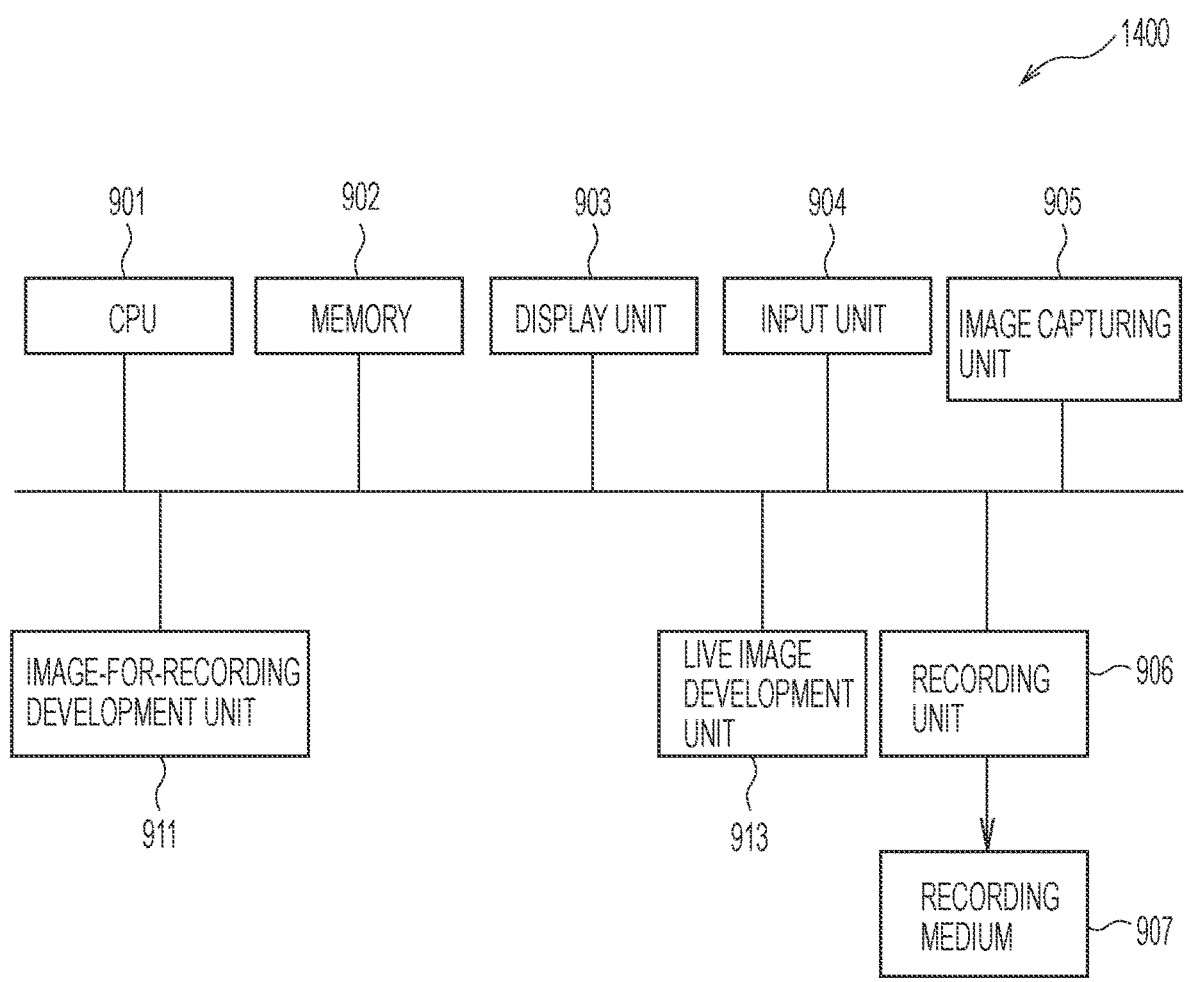
FIG. 14 is a diagram illustrating a hardware configuration of an image capturing apparatus according to a fourth embodiment.

Next, an image capturing apparatus according to a fourth embodiment is described focusing on differences from the image capturing apparatus 900 according to the third embodiment. FIG. 14 is a diagram illustrating a hardware configuration of an image capturing apparatus 1400. The image capturing apparatus 1400 has a hardware configuration similar to the hardware configuration of the image capturing apparatus 900 according to the third embodiment except that the image capturing apparatus 1400 does not include the image-for-displaying development unit 912.

Figure 15:
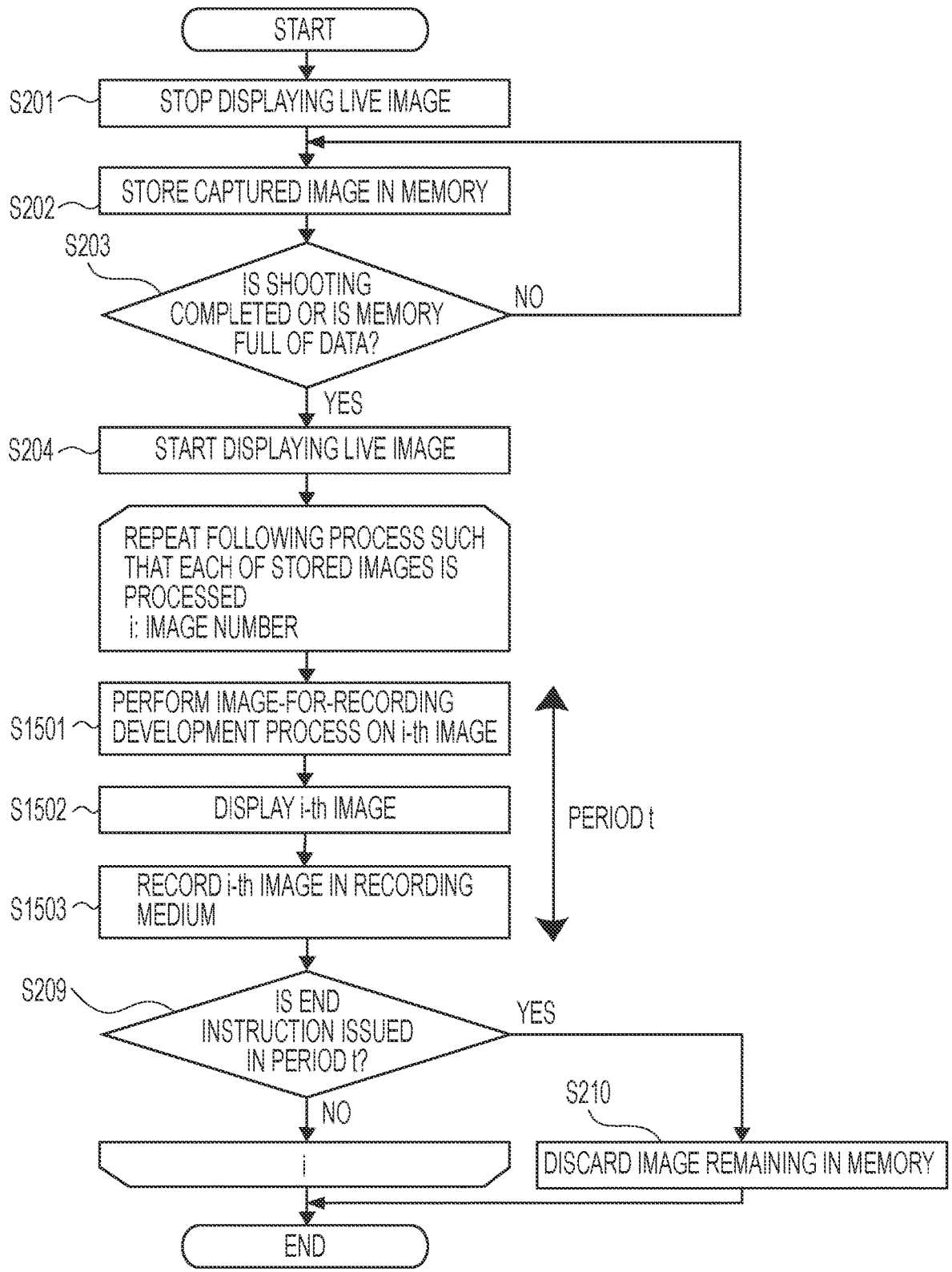
FIG. 15 is a flowchart illustrating a continuous shooting process.

FIG. 15 is a flowchart illustrating a continuous shooting process performed by the image capturing apparatus 1400. Processing steps of the continuous shooting process shown in FIG. 15 include similar steps to those according to the third embodiment described above with reference to FIG. 10, and such similar steps are denoted by similar step numbers. In the continuous shooting process according to the fourth embodiment, after the process in step S204, the CPU 901 performs a loop process including steps S1501 to S1503 and step S209 repeatedly such that a plurality of images stored in the memory 902 are each subjected to the steps in this loop process.

First, in step S1501, the CPU 901 performs control such that an i-th image to be processed is selected and the image-for-recording development process is performed on the i-th image. In response, the image-for-recording development unit 911 performs the image-for-recording development process. Next, in step S1502, the CPU 901 performs control such that an image for recording obtained by the image-for-recording development process is displayed together with a live image on the display unit 903. Next, in step S1503, the CPU 901 performs control such that the image for recording is recorded in the recording medium 907. Thereafter, the CPU 901 advances the process to step S209. Note that the configuration and the processing steps associated with the image capturing apparatus 1400 according to the fourth embodiment other than those described above are similar to the configuration and the processing steps associated with the image capturing apparatus 900 according to the third embodiment.

As described above, in the fourth embodiment, the image capturing apparatus 1400 displays the image for recording until the recording of the image for recording is completed after the development of the image for recording is finished. Note that the third embodiment may be preferable in a case where the development process takes a long time, while the fourth embodiment may be preferable in a case where the recording to the recording medium 907 takes a long time compared with the shooting speed in the continuous shooting process.

According to the third and fourth embodiments described above, it is possible to start a next continuous shooting at a desired timing.

OTHER EMBODIMENTS

Embodiments can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-109472, filed Jun. 7, 2018, and No. 2018-110632, filed Jun. 8, 2018, which are hereby incorporated by reference herein in their entirety.

What is claimed is:

1. An image capturing apparatus comprising:
   an image capturing unit;
   a first recording unit configured to record, in an image data storage area of a temporary storage, a plurality of images obtained by continuous shooting performed by the image capturing unit;
   a second recording unit configured to record, in a recording medium, image data recorded in the image data storage area of the temporary storage; and
   a control unit configured to perform control to, in a case where a first user operation and a second user operation are accepted while the second recording unit is performing a process of recording the image data in the recording medium, stop the process of recording the image data in the recording medium and clear the image data storage area of the temporary storage.

2. The image capturing apparatus according to claim 1, wherein
   in a case where the first user operation is accepted, the control unit performs control to enable the second user operation.

3. The image capturing apparatus according to claim 2, wherein
   in a case where the second user operation is accepted after being enabled, the control unit performs control to stop the process of recording the image data in the recording medium and clear the image data storage area of the temporary storage.

4. The image capturing apparatus according to claim 2, wherein
   in a case where the first user operation is accepted and a free storage capacity of the image data storage area of the temporary storage is less than a threshold value, the control unit performs control to enable the second user operation.

5. The image capturing apparatus according to claim 1, wherein
   the image capturing unit starts continuous shooting in response to the first user operation after the control unit performs control to clear the image data storage area of the temporary storage.

6. The image capturing apparatus according to claim 1, wherein
   in a case where the first user operation and a third user operation are accepted, the control unit performs control to stop the process of recording the image data in the recording medium, clear the image data storage area of the temporary storage, and delete image data corresponding to the continuous shooting recorded in the recording medium.

7. The image capturing apparatus according to claim 1, wherein
   in a case where the first user operation and a fourth user operation are accepted, the control unit performs control to enable a user operation to change a setting and stop the process of recording the image data in the recording medium, and
   in a case where the user operation to change the setting is accepted, the control unit performs control to restart the process of recording the image data in the recording medium in response to the change in the setting.

8. The image capturing apparatus according to claim 1, further comprising:
   a display control unit configured to, in response to accepting the first user operation, cause a display unit to display a message to inform the user that the image data recorded in the temporary storage will be discarded by the second user operation.

9. The image capturing apparatus according to claim 1, further comprising:
   a display control unit configured to, in response to accepting the first user operation, cause a display unit to display a message to inform the user that a continuous shooting operation is able to start by the second user operation.

10. The image capturing apparatus according to claim 1, wherein
    the first user operation is an operation of pressing down a shutter button.

11. The image capturing apparatus according to claim 10, wherein
    the second user operation is an operation of pressing down a second button located on a back face of the image capturing apparatus.

12. The image capturing apparatus according to claim 6, wherein
    the first user operation is an operation of pressing down a shutter button,
    the second user operation is an operation of pressing down a second button located on a back face of the image capturing apparatus, and
    the third user operation is an operation of pressing down a third button disposed at a location farther away from the shutter button than the location of the second button.

13. An image processing method comprising:
    recording, in an image data storage area of a temporary storage, a plurality of images obtained by a continuous shooting operation performed by an image capturing unit;
    recording image data recorded in the temporary storage into a recording medium; and
    performing control to, in a case where a first user operation and a second user operation are accepted during a process of recording the image data into the recording medium, stop the process of recording the image data into the recording medium and clear the image data storage area of the temporary storage.

14. A non-transitory computer-readable storage medium storing a program for causing a computer to execute an image processing method, the image processing method comprising:
  recording, in an image data storage area of a temporary storage, a plurality of images obtained by a continuous shooting operation performed by an image capturing unit;
  recording image data recorded in the temporary storage into a recording medium; and
  performing control to, in a case where a first user operation and a second user operation are accepted during a process of recording the image data into the recording medium, stop the process of recording the image data into the recording medium and clear the image data storage area of the temporary storage.

* * * * *